United States Patent [19]

Lagier et al.

[11] Patent Number: 5,144,597
[45] Date of Patent: Sep. 1, 1992

[54] LOW-FREQUENCY HYDROPHONE AND SONAR ARRAY INCLUDING SUCH HYDROPHONES

[75] Inventors: Michel Lagier, Le Cannet; Claude Gragnolati, Cannes; Jena-Pierre Besombes, Corbeil-Essonnes, all of France

[73] Assignee: Thomson-CSF, Puteaux, France

[21] Appl. No.: 634,533

[22] Filed: Dec. 27, 1990

[30] Foreign Application Priority Data

Jan. 5, 1990 [FR] France .................. 90 00077

[51] Int. Cl.$^5$ .................................... H04R 17/00
[52] U.S. Cl. ................... 367/166; 367/155; 310/337
[58] Field of Search ............. 367/155, 157, 160, 161, 367/164, 166; 310/337, 800, 328

[56] References Cited

U.S. PATENT DOCUMENTS

| | | |
|---|---|---|
| 3,757,888 | 9/1973 | Lajier et al. .................. 181/198 |
| 4,068,209 | 1/1978 | Lagier .................. 367/158 |
| 4,547,870 | 10/1985 | Maerfeld et al. .................. 367/155 |
| 4,712,201 | 12/1987 | Lagier .................. 367/92 |
| 4,751,013 | 6/1988 | Kaarmann et al. .................. 310/800 X |
| 4,839,872 | 6/1989 | Oragnolati et al. .................. 367/180 |
| 4,868,447 | 9/1989 | Lee et al. .................. 310/328 |
| 4,876,675 | 10/1989 | Ogura et al. .................. 367/155 |
| 4,883,143 | 11/1989 | Lagier .................. 187/286 |
| 5,003,285 | 3/1991 | Geil .................. 367/155 X |

Primary Examiner—Brian S. Steinberger
Attorney, Agent, or Firm—Oblon, Spivak, McClelland, Maier & Neustadt

[57] ABSTRACT

A low-frequency hydrophone for a sonar array comprises at least a lacunary ceramics element with open porosity saturated by a viscous fluid, on which metal electrodes have been deposited. This hydrophone forms a high-pass filter whose cutoff frequency is adjusted by modulating the area of the electrodes. The present invention may find particular application in towed linear arrays and passive sonars.

10 Claims, 4 Drawing Sheets

FIG_1 PRIOR ART
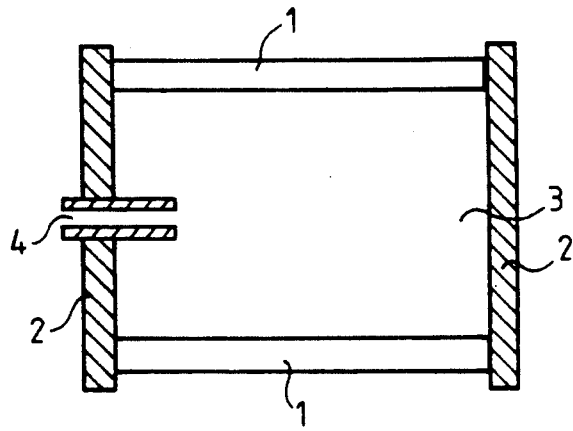
FIG_3
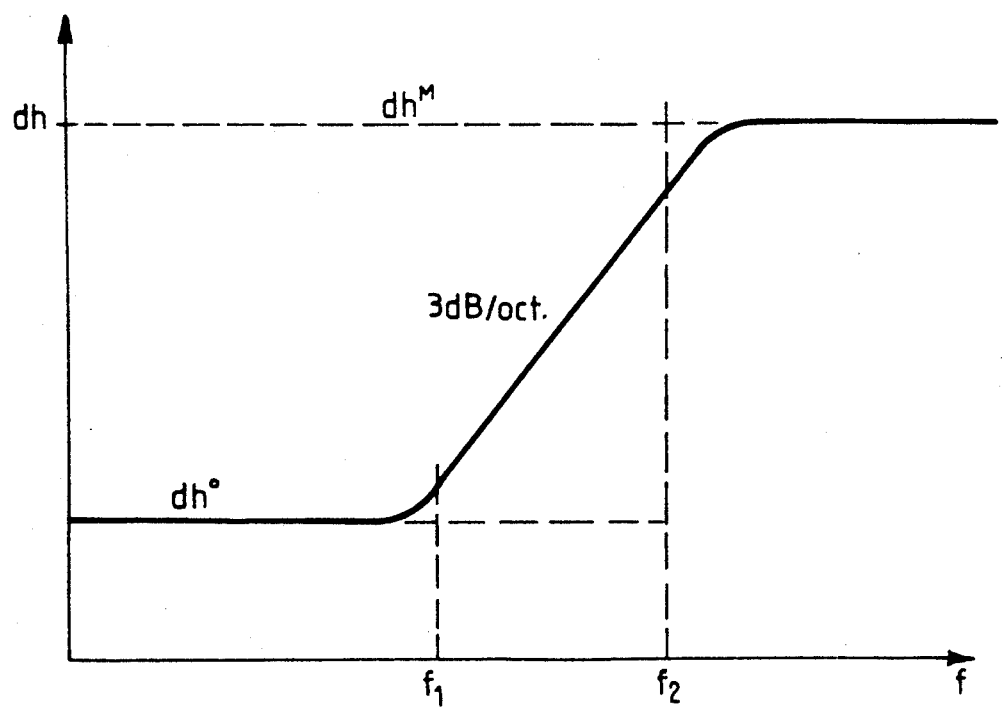

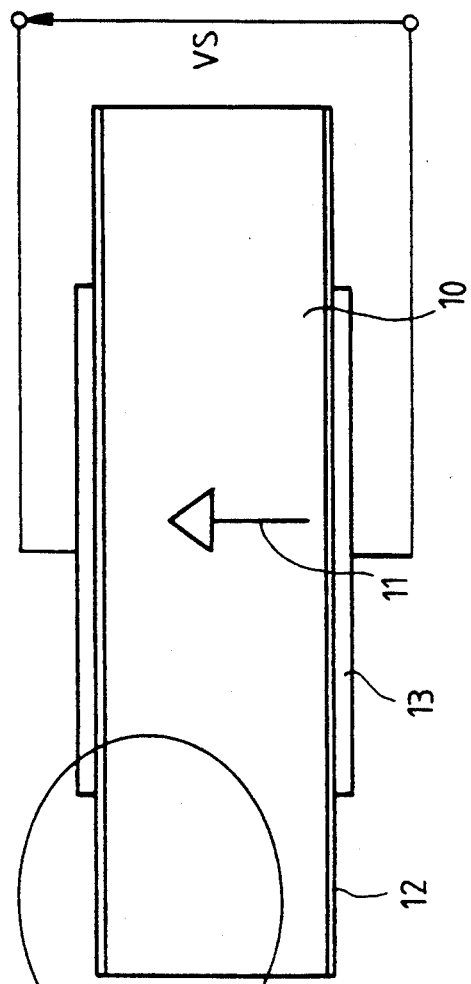
FIG._2a
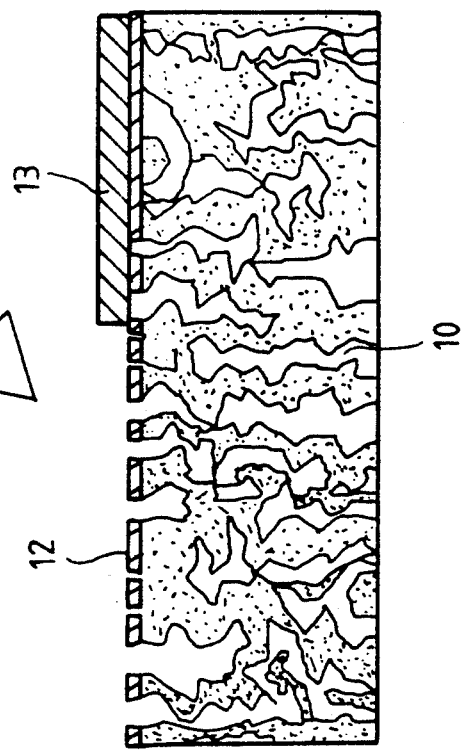
FIG.2b

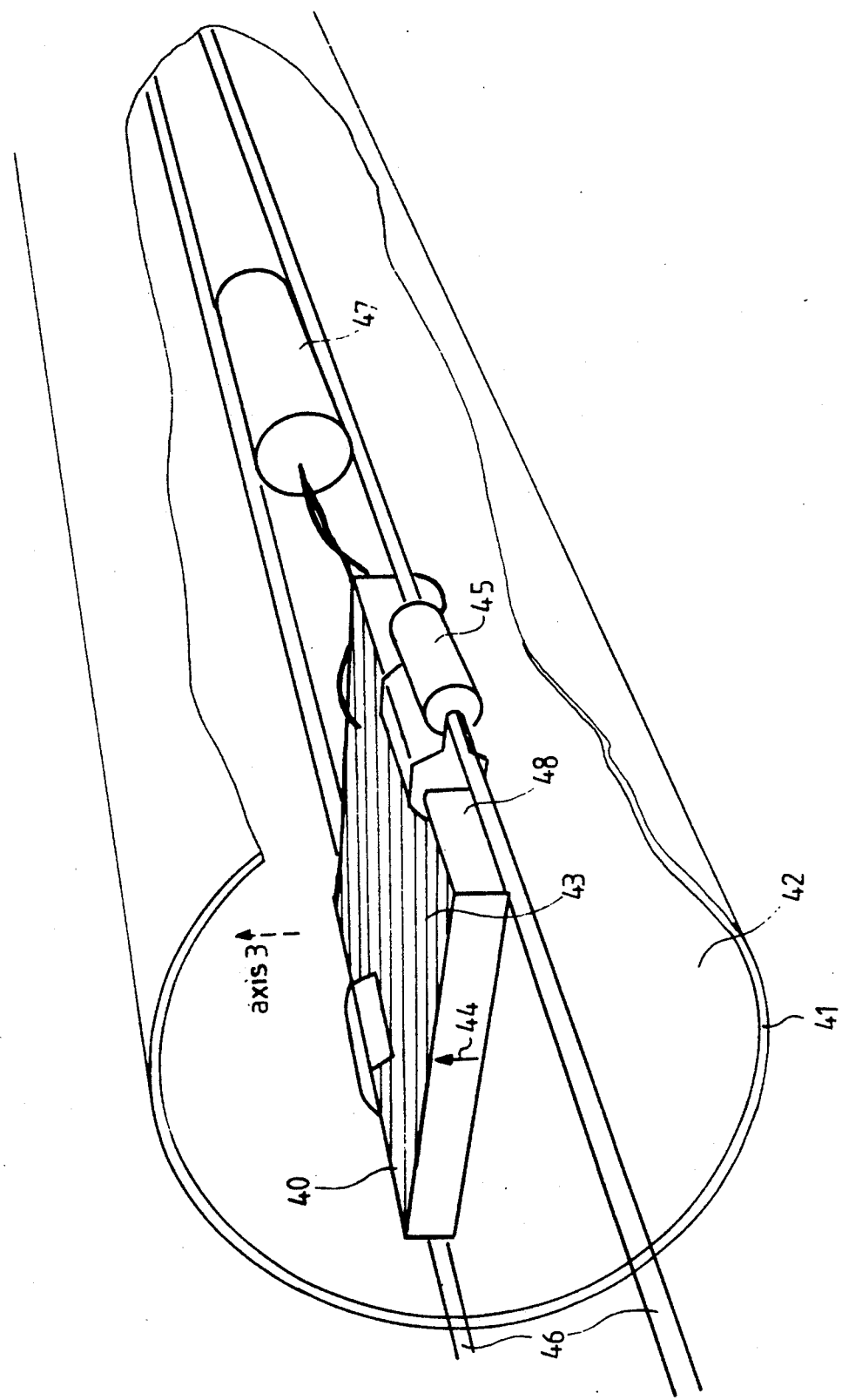

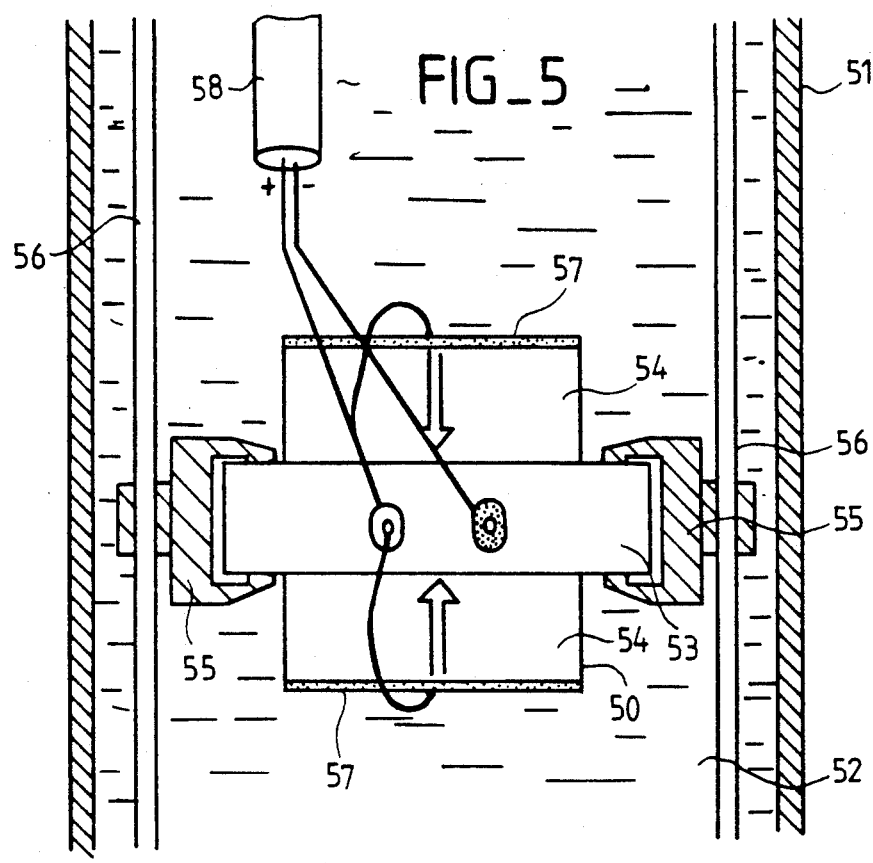
FIG_5
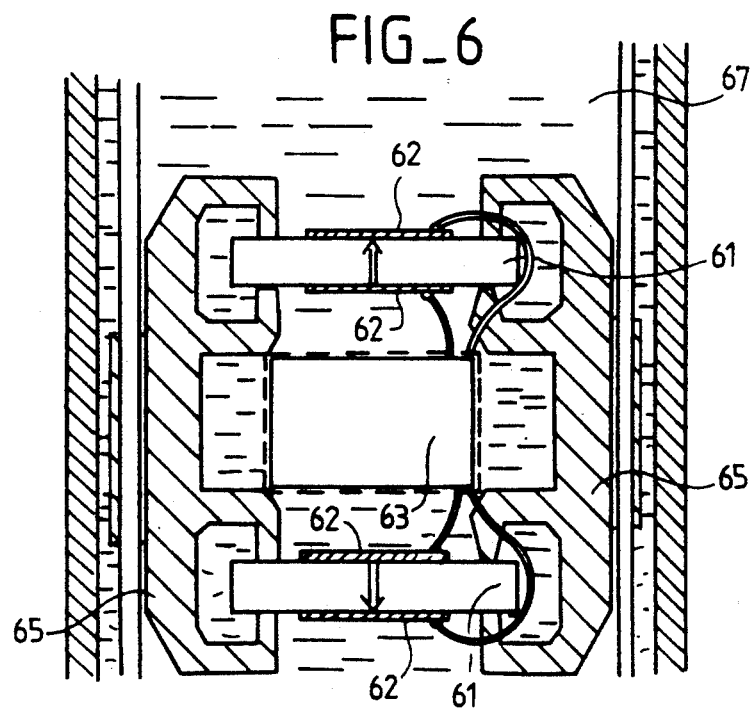
FIG_6

LOW-FREQUENCY HYDROPHONE AND SONAR ARRAY INCLUDING SUCH HYDROPHONES

BACKGROUND OF THE INVENTION

1. Field of the Invention

The present invention relates to low-frequency hydrophones destined to be used in towed sonar linear arrays, and to sonar arrays including such hydrophones.

2. Description of the Prior Art

Towed sonar linear arrays, due to their long length, are used at low frequencies, typically between 50 Hz and 2000 Hz. They are made up of a great number of hydrophones which must have a high sensitivity, a low noise, a pressure resistance in excess of 150 bars, a low cost because of their great number, and a small size, that is dimensions shorter than 50 mm.

In the band of frequencies included between 50 Hz and 2000 Hz, the dynamic range of noise is significant. For example, sea noise decreases by 30 dB between 50 Hz and 1000 Hz. Consequently, a hydrophone is always followed by a highpass filter which eliminates the noise at the very low frequencies, and by a filter which levels sea noise and is referred to as a "whitening filter". However, the signals picked up by the hydrophone are preliminary amplified in a preamplifier located before the filters; the dynamic range of the signals being very large, this preamplifier generally saturates, and hence the filtering steps are not efficient. It is known to remedy the saturation of the preamplifier by a preliminary filtering at the hydrophone, which allows reduction of the dynamic range of the signals at the input of the preamplifier.

FIG. 1 shows a capillary hydrophone according to the prior art. This hydrophone is composed of a hollow tube 1 made of a piezoelectric ceramics such as PZT, closed at both ends by two rigid caps 2 delimiting a cavity 3. This hydrophone is pressure-balanced thanks to a capillary tube 4 attached to one of the caps and allowing the internal cavity 3 to communicate with the outside of the hydrophone to equalize the slow changes in pressure. This capillary tube 4 also serves as a mechanical filter and allows reduction of the dynamic range of the signals at the input of the preamplifier.

However, a capillary hydrophone is difficult to construct, costly and too bulky to be accommodated in towed linear arrays.

It is also known to construct very simple hydrophones with dry lacunary ceramics which are very high performance materials.

A lacunary ceramics is a composite material one phase of which is piezoelectric (high density, high permittivity and high Young modulus) and the other phase of which is gaseous (air). These ceramics, the so-called "dry lacunary ceramics", are porous and the porosity represents the gaseous volume fraction. According to a known manufacturing process, it is also possible to obtain a material with open porosity. These ceramics are characterized by a hydrostatic sensitivity increased relative to compact ceramics and having a density lower than conventional ceramics, for example a PZT ceramics has a density of about 7.3 and a hydrostatic sensitivity of about 47 picocoulomb/newton, whereas a dry lacunary ceramics with a density of about 4 has a sensitivity of about 186 picocoulombs/newton.

To construct a hydrophone, it is sufficient to deposit electrodes on a dry lacunary ceramics, to connect leads to the electrodes and to apply a coating which closes the openings of the pores. However, a weak point of this material is its brittleness, which makes impossible the applications of this type of microphone for high hydrostatic pressures at very low frequencies.

SUMMARY OF THE INVENTION

The present invention relates accordingly to a low-frequency hydrophone which is pressure-balanced and behaves at low frequencies as a mechanical filter not exhibiting the disadvantages of capillary hydrophones, which means it is simple to construct, low-cost and its size can be adapted to be used in towed linear arrays, by using a saturated lacunary ceramics withstanding high hydrostatic pressures.

The low-frequency hydrophone according to the present invention is characterized in that it comprises at least a lacunary ceramics with open porosity saturated by a viscous fluid, on which electrodes have been deposited.

The present invention also relates to a sonar array including such hydrophones.

BRIEF DESCRIPTION OF THE DRAWINGS

Other features and advantages of the present invention will become apparent from the following detailed description of preferred embodiments given as a non-limitative example with reference to the accompanying drawings, in which:

FIG. 1, already mentioned, shows a capillary hydrophone according to the prior art;

FIG. 2 is a sectional view of a lacunary ceramics on which electrodes have been deposited, according to the invention;

FIG. 3 illustrates the sensitivity of a saturated lacunary ceramics as a function of frequency;

FIG. 4 shows a flatplate hydrophone according to the invention;

FIG. 5 shows a symmetrical disk microphone with a low cutoff frequency according to the invention; and FIG. 6 shows a symmetrical disk hydrophone with a high cutoff frequency according to the invention.

DESCRIPTION OF THE PREFERRED EMBODIMENT

Referring to FIG. 2, there is shown a sectional view of a lacunary ceramics with open porosity on which electrodes have been deposited. The lacunary ceramics with open porosity 10 is in the form of a disk or a plate polarized along an axis referred to as "axis 3". The direction of polarization of the ceramics is indicated by an arrow 11. During the fabrication of the ceramics, a deposition of porous silver 12 has been carried out on both sides of the ceramics perpendicular to the axis 3 in order to facilitate the later deposition of two metal electrodes 13. These electrodes 13 seal a portion of the pores of the ceramics. Under the action of an external stress, such as a pressure, perpendicular to the plane of the electrodes, a potential difference VS appears between the two electrodes 13 due to the creation of electric charges by piezoelectric effect.

These lacunary ceramics with open porosity have a good behaviour under pressure because the open porosity allows the hydrostatic pressure to be balanced in the material and avoids the accumulation of static stresses which generally lead to a depolarization of the material.

Referring to FIG. 3, there is shown the variation of the sensitivity of a saturated lacunary ceramics as a function of frequency according to the present invention. The hydrostatic sensitivity dh of a ceramics is a piezoelectric coefficient which measures the charge on the electrode for a hydrostatic stress of 1 newton. By saturating the lacunary ceramics with open porosity with a viscous fluid, the hydrostatic sensitivity dh of the ceramics increases with frequency in such a manner that a hydrophone comprised of such a ceramics behaves as a high-pass filter because the material includes a tridimensional capillary with multiple connections formed by the pores, in a "framework" formed by the piezoelectric portion of the ceramics, which exhibits a certain elasticity. The cutoff frequency $f_1$ of the filter depends on the dynamic viscosity $\eta$ of the fluid, on the elasticity modulus s of the framework, on the effective cross-section $\sigma_c$ of the tridimensional capillary, and on the effective length Le of this tridimensional capillary. In the case of a ceramics with a parallelepipedal shape with the dimensions L1, L2, L3, we have:

$$Le^{-2} = L1^{-2} + L2^{-2} + L3^{-2}.$$

The modulus of the sensitivity dh of a saturated lacunary ceramics obeys the following law:

$$|dh| = dh^0 (1 + f^2/f_1^2)^{\frac{1}{2}} \times (1 + f^2/f_2^2)^{-\frac{1}{2}},$$

with $f_2 = f_1 \times dh^M/dh^0$, where $dh^0$ is the hydrostatic sensitivity of the ceramics at low frequencies and $dh^M$ is the hydrostatic sensitivity of the ceramics at high frequencies.

At low frequencies $f < f_1$, the pores of the lacunary ceramics have a low acoustic impedance and the dynamic pressure due to an incident acoustic wave enters all the pores and establishes itself without any phase shift in the bulk of the material. There is thus a balance of the pressures between the outside and the inside of the ceramics, and the sensitivity of the ceramics is low and equal to $dh^0$.

At high frequencies $f > f_2$, the pores of the lacunary ceramics exhibit a high acoustic impedance, the framework of the ceramics is compressed, and the sensitivity of the saturated lacunary ceramics is high and equal to $dh^M$.

At intermediate frequencies $f_1 < f < f_2$, both previous phenomena coexist and there is a competition between the dynamic pressure which tends to become balanced and the framework which becomes compressed. The sensitivity dh of the saturated lacunary ceramics increases linearly between $dh^0$ and $dh^M$ with a slope close to $-3$ dB per octave.

The cutoff frequency $f_1$ can be adjusted by sealing more or less of the surface of the ceramics so as to reduce the contact surface of the ceramics with the viscous fluid, in particular by modulating the area of the electrodes. Thus, for a given geometry, it is possible to lower the cutoff frequency $f_1$ without varying the viscosity by increasing the area of the electrodes because $f_1$ is proportional to $\sigma_c/Le^2$. In the case of a towed linear array including a watertight outer sheath containing an inner viscous fluid, this inner filling fluid is used as a viscous fluid to saturate the lacunary ceramics. The hydrophone thus obtained has a minimum cost.

By way of numerical example, there has been constructed a hydrophone with a lacunary ceramics with the shape of a disk of 36 mm in diameter and 10 mm in height saturated by an oil with a dynamic viscosity equal to 30 centipoises. The density of the lacunary ceramics was equal to 4, and the porosity to 0.46. The cutoff frequency $f_1$ was equal to 600 Hz, and the dynamic range $dh^M/dh^0$, which depends only on the base material and the porosity, was approximately equal to 10 (that is 20 dB).

FIG. 4 shows a nonsymmetrical flatplate hydrophone 40 placed in a cylindrical linear array including a watertight outer sheath 41 made of polyurethane, for example, this array being filled with a viscous fluid 42.

The hydrophone 40 is comprised of a lacunary ceramics 48 with the shape of a plate, saturated by the viscous fluid 42 filling the array. On both sides of the ceramics parallel to the longitudinal axis of the array, an electrode 43 has been deposited. The polarization axis of the ceramics, or "axis 3", is perpendicular to the longitudinal axis of the array to make the hydrophone 40 insensitive to the transverse accelerations of the array. This hydrophone 40 is held in place by two fastening and decoupling elements 45 themselves fastened to two carrying cables 46 disposed along the sheath 41 and parallel to the axis of the array. This hydrophone 40 is connected to a preamplifier 47 through its electrodes 43.

Referring to FIG. 5, there is shown a sectional view of a symmetrical hydrophone 50 placed in a cylindrical linear array 51 filled with a viscous fluid 52. This hydrophone 50 is comprised of a central metal disk 53 forming an electrode, on either side of which are disposed two disks 54 of lacunary ceramics with open porosity saturated by the filling fluid of the array, such that the axis normal to the surfaces of the disks 53, 54 is parallel to the longitudinal axis of the array. The hydrophone 50 is centered in the array by two centering and mechanical-decoupling elements 55 fastened to two carrying cables 56 disposed parallel to the longitudinal axis of the array and symmetrical with respect to this axis. The outer side of each of these two disks of lacunary ceramics 54 is fully covered by an electrode 57, so the cutoff frequency $f_1$ is low. The ceramics disks 54 are polarized in a direction parallel to the axis of the linear array, the directions of polarization being from the outer electrodes 57 toward the central metal disk 53. The output signal of the hydrophone 50 is amplified by a preamplifier 58.

FIG. 6 is a sectional view of a symmetrical hydrophone placed in a cylindrical linear array filled with a viscous fluid 67. This hydrophone comprises two separate disks of lacunary ceramics 61 with open porosity saturated by the fluid filling the array and such that on the sides of each of these disks two electrodes of short length 62 are deposited. These disks 61 are such that the axis normal to their surfaces is parallel to the longitudinal axis of the array and are polarized in a direction parallel to the axis of the array, the directions of polarization being opposite. All four electrodes 62 are connected to a preamplifier 63 covered by a wire netting 64 forming a Faraday shield and disposed between the two disks of lacunary ceramics 61. Two centering and mechanical-decoupling elements 65 hold the ceramics disks 61 and the preamplifier 63 in place in the array. In this hydrophone, the surface of the lacunary ceramics in contact with the viscous fluid is optimized and the electrodes 62 have an area as small as possible so that the cutoff frequency $f_1$ is high.

Other embodiments can be envisaged, in particular hydrophones with a tubular geometry and a radial polarization can also be constructed.

In the case where the cutoff frequency is adjusted to a high value, i.e., when the electrodes have a small area, the hydrophone is made resistant to submarine explosions.

The present invention is not limited to the particular embodiments described here; in particular, the construction of a hydrophone with a lacunary ceramics saturated by a viscous fluid filling the linear array allows obtaining a hydrophone at a minimum cost and which is particularly simple, but any other viscous fluid different from the filling fluid can be used to saturate the lacunary ceramics.

Other applications can be envisaged: in passive sonars for which the monitoring frequency band poses problems of saturation and of sea noise "whitening", the hydrophones described above may be used.

What is claimed is:

1. A hydrophone for detecting signals and for use in a sonar array, comprising:
    at least one lacunary ceramics element with an open porosity;
    a viscous fluid for saturating said at least one lacunary ceramics element; and
    a plurality of metal electrodes, one of said plurality of metal electrodes being deposited on each side of said at least one lacunary ceramics element;
    wherein said hydrophone forms a high-pass filter whose cut-off frequency is adjusted based on a proportion of a surface area of said metal electrodes deposited on said lacunary ceramics element, whereby the cut-off frequency can be lowered by increasing the surface area of said metal electrodes deposited on lacunary ceramics element without varying the viscosity of the viscous fluid.

2. A low-frequency hydrophone according to claim 1, wherein said lacunary ceramics element is polarized perpendicularly to a plane of said metal electrodes.

3. A low-frequency hydrophone according to claim 1, wherein a central metal disk forms one of said plurality of metal electrodes, on both side of which are attached two disks of lacunary ceramics with open porosity saturated by the viscous fluid, an external side of each disk of lacunary ceramics being fully covered by an electrode.

4. A low-frequency hydrophone according to claim 1, wherein said at least one lacunary ceramics element comprises two separate disks of lacunary ceramics saturated by the viscous fluid such that on sides of each of said disks two metal electrodes are deposited.

5. A low-frequency hydrophone according to any one of claims 1-4, wherein said hydrophone is disposed as part of a linear sonar array comprising a plurality of said hydrophones and is disposed inside a watertight sheath filled with the viscous fluid, wherein said viscous fluid used to saturate the lacunary ceramics of said hydrophones is a filling fluid of the array.

6. A hydrophone for detecting low-frequency signals between 50 and 2000 Hz and for use in a sonar array, comprising:
    at least one lacunary ceramics element with an open porosity;
    a viscous liquid for saturating said at least one lacunary ceramics element; and
    a plurality of metal electrodes, one of said plurality of metal electrodes being deposited on each side of said at least one lacunary ceramics element;
    wherein said hydrophone forms a high-pass filter whose cut-off frequency is adjusted based on a proportion of a surface area of said metal electrodes deposited on said lacunary ceramics element, whereby the cut-off frequency can be lowered by increasing the surface area of said metal electrodes deposited on lacunary ceramics element without varying the viscosity of the viscous fluid.

7. A low-frequency hydrophone according to claim 6, wherein said lacunary ceramics element is polarized perpendicularly to a plane of said metal electrodes.

8. A low-frequency hydrophone according to claim 6, wherein a central metal disk forms one of said plurality of metal electrodes, on both sides of which are attached two disks of lacunary ceramics with open porosity saturated by the viscous liquid, an external side of each disk of lacunary ceramics being fully covered by an electrode.

9. A low-frequency hydrophone according to claim 6, wherein said at least one lacunary ceramics element comprises two separate disks of lacunary ceramics saturated by the viscous liquid such that on sides of each of said disks two metal electrodes are deposited.

10. A low-frequency hydrophone according to any one of claims 6-9, wherein said hydrophone is disposed as part of a linear sonar array comprising a plurality of said hydrophones and is disposed inside a watertight sheath filled with the viscous liquid, wherein said viscous liquid used to saturate the lacunary ceramics of said hydrophones is a filling liquid of the array.

* * * * *